Dec. 17, 1946.   J. J. LOVAS ET AL   2,412,818
SEPARATION OF THE COMPONENTS OF A MIXTURE
OF FATTY ACIDS AND ROSIN ACIDS
Filed Aug. 1, 1942
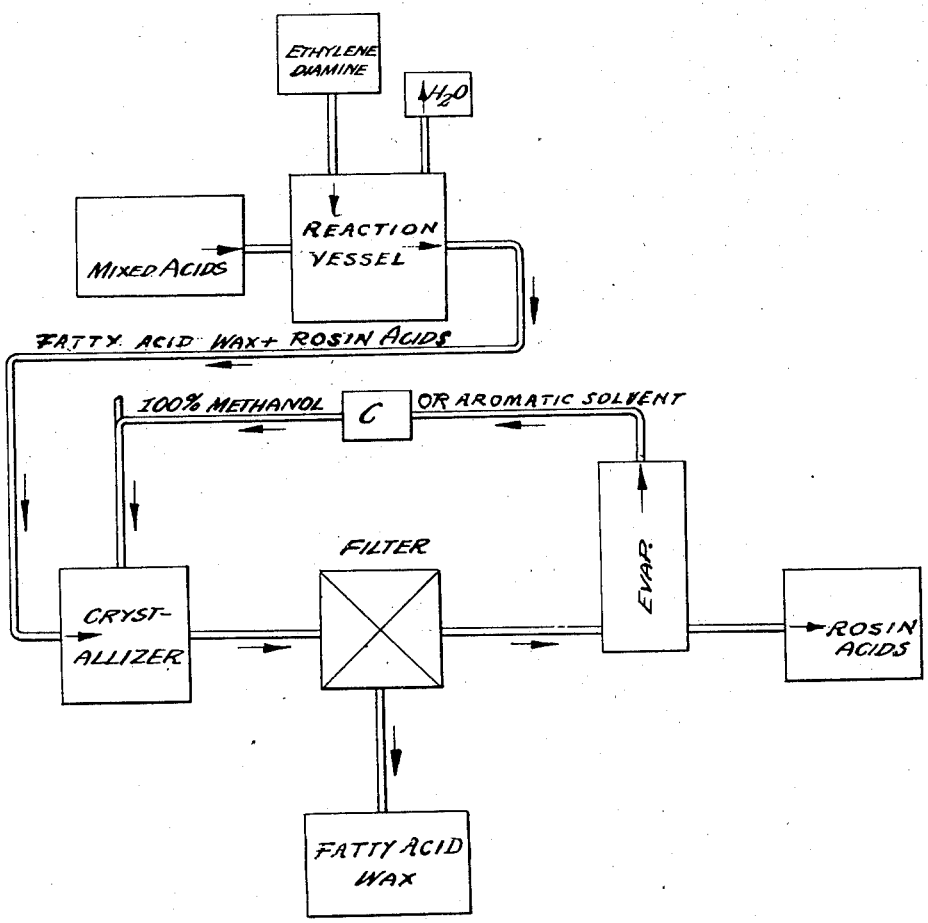
INVENTORS: Joseph John Lovas
James F. Loughlin
BY
A. Lee Helms
ATTORNEY.

Patented Dec. 17, 1946

2,412,818

UNITED STATES PATENT OFFICE 2,412,818

SEPARATION OF THE COMPONENTS OF A MIXTURE OF FATTY ACIDS AND ROSIN ACIDS

Joseph John Lovas, Ridgewood, and James F. Loughlin, New York, N. Y.

Application August 1, 1942, Serial No. 453,294

2 Claims. (Cl. 260—97.5)

The invention relates in general to the preparation of waxes from fatty acids, and in particular to a process of preparing waxes from the fatty acids present in mixed fatty and rosin acids prepared from kraft pulp mill waste soap.

The mixed acids contain varying percentages of fatty acids and rosin acids. The fatty acids consist principally of unsaturated fatty acids such as oleic acid with smaller proportions of linoleic acid and linolenic acids.

The general object of the invention is to prepare waxes from the above unsaturated fatty acids and also from saturated fatty acids.

A specific object of the invention is to prepare waxes from the fatty acids and to separate these waxes from the rosin acid constituents of the "mixed acids."

A further object of this invention is to provide a process for the searation of the fatty and rosin acid constituents in a mixture of fatty acid constituents and rosin acid constituents.

Other objects will in part be obvious and will in part hereinafter appear.

We have now found that waxes can be prepared from saturated and unsaturated fatty acids by reacting these acids with ethylene diamine according to the following reaction, using oleic acid as an example:

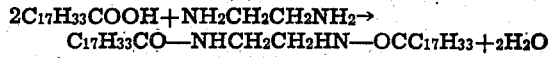
$2C_{17}H_{33}COOH + NH_2CH_2CH_2NH_2 \rightarrow$
$\quad C_{17}H_{33}CO-NHCH_2CH_2HN-OCC_{17}H_{33} + 2H_2O$ We have found that when mixtures of fatty and rosin acids are treated at an elevated temperature with ethylene diamine in quantity sufficient only to react with the fatty acids, the fatty acid components will react to form waxes, while the rosin acid components will not. The resulting mixture comprises a fatty acid wax and rosin acid. We have found that the rosin acids may be extracted from the fatty wax by a suitable solvent such as methanol for unsaturated fatty acid waxes. The wax thus obtained is practically free of rosin acids.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention, the fatty acids may be saturated or unsaturated, and may be combined with or free of rosin acids.

During the step of separating the fatty waxes from the unreacted rosin acids, any suitable solvent such as methanol may be used in cases where the original fatty acid was unsaturated. In cases where the original fatty acid was saturated, a solvent such as benzene, toluene or xylene is required. During the step of separating the fatty acid waxes from the unreacted rosin acids, any solvent may be used in which all the constituents are soluble when hot and in which solvent only the fatty acid waxes are substantially insoluble when cold.

A water solution containing 69.3% ethylene diamine was used in performing this synthesis, but the theoretical quantity of any reasonable concentration in water may be used since water is evaporated from the mixture during the reaction.

For a further understanding of the nature and objects of the invention, reference should be had to the accompanying drawing, and to the following examples which are given merely to further illustrate the invention and are not to be construed in a limiting sense.

The drawing illustrates diagrammatically the set-up of suitable apparatus. A reaction vessel which will be heated, receives the mixed fatty and rosin acids, or tall oil, and the vessel also receives ethylene diamine and discharges water vapor. The treated mixture, after completion of the reaction in the reaction vessel is completely dissolved in a suitable heated solvent. This may be done in the reaction vessel or in a separate vessel such as the crystallizer. This heated solution is then cooled sufficiently to cause the fatty acid wax or waxes to crystallize while substantially all of the other constituents remain in solution in the solvent. The crystallized wax (or waxes) is then separated and recovered from the solvent solution, as by the filter shown. The filtrate may be led to a still or evaporator, the solvent evaporated, condensed and run back for re-use in the process. Upon evaporation of the solvent from the filtrate, any rosin acids or other constituents not previously removed, will be recovered as end-product.

*Example I*

100 grams of a mixed fatty and rosin acid with an acid number of 184 and a rosin acid number of 72.5 was heated for a period of 4 hours at a temperature of 180°–200° C. with 8.65 gm. of a 69.3% solution ethylene diamine in water. This operation was carried out in a 500 cc. round bottom flask fitted with a glass tube connecting with a water cooled condenser leading downward to a collecting vessel. During the heating period, 6.4 grams of distillate were collected. This distillate was accounted for as follows:

| | Grams |
|---|---|
| Water from 69.3% ethylene diamine | 2.65 |
| Water from the reaction | 2.59 |
| Distillate from other sources | 1.16 |

After allowing the product to cool, 100.2 grams of a hard brown wax was obtained.

In order to separate the fatty acid waxes produced from the unsaturated acids present in the mixture, from the unreacted rosin acids in the crude wax, the crude mixture was entirely dissolved in 100 cc. of anhydrous methanol at 50° C. On chilling, a light brown wax was crystallized and filtered from a dark brown filtrate. By recrystallizing from successive 90, 75, 50, 50 and 25 cc. portions of methanol, 38 grams of a white wax was prepared:

Melting point of wax=110°–115° C.
Iodine value of wax=89.9

It was found that this unsaturated fatty acid wax was likewise soluble in warm $CCl_4$ and in warm hexane.

*Example II*

50 grams of tall oil with a fatty acid content of 47.7% and a rosin acid content of 44.2% were heated for a period of 6 hours at a temperature of about 180°–200° C., with 3.33 grams of ethylene diamine. This operation was carried out in the same equipment as was used in Example I. During the heating period 1.9 grams of distillate resulted and was eliminated. After cooling and crystallizing from methanol, 51.0 grams of a brown wax was obtained. This crude wax was also quite hard. A white unsaturated fatty acid wax similar to that prepared from the mixed acids in Example I was prepared from the crude mixture by crystallizing from methanol.

*Example III*

50 grams of pure stearic acid were heated for a period of 6 hours at a temperature of about 180° C.–200° C., with 7.65 grams of ethylene diamine. During the heating period, 4.3 grams of distillate were collected. After dissolving the mixture in warm xylol followed by cooling, 52.4 grams of a very hard, light brown wax were crystallized out. This saturated fatty acid wax was found to be only slightly soluble in warm methanol, and quite soluble in warm benzol and xylol.

*Example IV*

A mixed fatty and rosin acid with a fatty acid content of 83.3% fatty acid, had previously been hydrogenated to prepare a mixture of stearic and rosin acids. 60 grams of this mixed acid were heated and mixed with 5.4 grams of ethylene diamine at a temperature of about 200°–210° C. for a period of 5 hours. The product was dissolved in a hot aromatic solvent followed by cooling, and 58 grams of a hard, gray-brown wax were crystallized out. Melting point of crude wax=126° C.

In order to separate the stearic acid wax compound from the unreacted rosin acids, the crude wax was dissolved in 200 cc. of hot xylol. On chilling, the stearic acid wax compound was very readily crystallized. It was purified by recrystallizing from fresh xylol and filtered out. Benzol and toluol are entirely suitable. 65.8% of the crude wax was recovered as stearic acid wax compound and 34.2% was recovered from the filtrate as rosin acids.

It will be understood that the degree of hydrogenation of the mixed fatty and rosin acids will have relation upon the hardness of the recovered fatty acid wax, and that for recovery of wax acid wax with a lower melting point will not be completely hydrogenated.

Since certain changes may be made in carrying out the above process without departing from the scope of the invention, it is intended that all matter contained in the above description shall be interpreted as illustrative and not in a limiting sense. For example, the prescribed temperatures and times of reaction may be varied under reasonable limits. However, simultaneously reducing the specified preferred temperature, thereby increasing the time of reaction, and raising the temperature substantially above 200° C. may result in decomposition. The temperature range and time of reaction are related and subject to variation over the ranges given in the examples, and which are preferred. While in the examples the preferred temperature range of 180°–200° C. was specified, the temperature may be reduced to about 150° C. (this however, requiring a longer time for the reaction) or the temperature may be raised to about 225° C. and correspondingly reducing the time of reaction.

It is also to be understood that the following claims are intended to cover all the generic and specific features of the invention herein described, and all statements of the scope of the invention, which as a matter of language might be said to fall therebetween.

Having described our invention, what we claim and desire to secure by Letters Patent is as follows:

1. A process for separating the fatty acid and rosin acid components of acids derived from the hydrolysis of kraft pulp mill soap which comprises the steps of: reacting the mixed acids with the theoretical quantity of ethylene diamine at an elevated temperature to form a fatty acid amide; dissolving the mixture resulting from said reaction in a heated solvent selected from the group consisting of methanol, carbon tetrachloride and hexane; cooling the solution and removing the precipitated amide.

2. A process for separating the fatty acid and rosin acid components of acids derived from the hydrolysis of kraft pulp mill soap which comprises the steps of: reacting the mixed acids with the theoretical quantity of ethylene diamine at a temperature from about 150° C. to 225° C. to form a fatty acid amide; dissolving the mixture resulting from said reaction in a heated solvent selected from the group consisting of methanol, carbon tetrachloride and hexane; cooling the solution and removing the precipitated amide.

JOSEPH JOHN LOVAS.
JAMES F. LOUGHLIN.